(12) United States Patent
Hong et al.

(10) Patent No.: US 12,125,488 B2
(45) Date of Patent: Oct. 22, 2024

(54) ELECTRONIC APPARATUS AND CONTROL METHOD THEREOF

(71) Applicant: Samsung Electronics Co., Ltd., Suwon-si (KR)

(72) Inventors: Jiyoun Hong, Suwon-si (KR); Hyeonmok Ko, Suwon-si (KR); Dayoung Kwon, Suwon-si (KR); Jonggu Kim, Suwon-si (KR); Seoha Song, Suwon-si (KR); Kyenghun Lee, Suwon-si (KR); Hojung Lee, Suwon-si (KR); Saebom Jang, Suwon-si (KR); Pureum Jung, Suwon-si (KR); Changho Paeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 17/523,367

(22) Filed: Nov. 10, 2021

(65) Prior Publication Data

US 2022/0262364 A1    Aug. 18, 2022

Related U.S. Application Data

(63) Continuation of application No. PCT/KR2021/012655, filed on Sep. 16, 2021.

(30) Foreign Application Priority Data

Feb. 17, 2021    (KR) ........................ 10-2021-0021438

(51) Int. Cl.
*G10L 15/26*    (2006.01)
*G10L 15/16*    (2006.01)
*G10L 15/197*    (2013.01)

(52) U.S. Cl.
CPC .............. *G10L 15/26* (2013.01); *G10L 15/16* (2013.01); *G10L 15/197* (2013.01)

(58) Field of Classification Search
CPC ......... G10L 15/00; G10L 15/16; G10L 15/26; G10L 15/197; G06F 40/00; G06F 40/30; G06F 40/216; G06F 40/289; G06F 40/295
See application file for complete search history.

(56) References Cited

U.S. PATENT DOCUMENTS 6,173,261 B1    1/2001    Arai et al.
8,447,607 B2    5/2013    Weider et al.
(Continued)

FOREIGN PATENT DOCUMENTS

JP              5667962 B2    2/2015
KR    10-2017-0037593 A    4/2017
(Continued)

OTHER PUBLICATIONS

Mishra, A., Patel, D., Vijayakumar, A., Li, X. L., Kapanipathi, P., & Talamadupula, K. (Jun. 2021). Looking beyond sentence-level natural language inference for question answering and text summarization. In Proc. of the 2021 Conf. of the Assn. for Comp. Ling.: Human Lang. Tech. (pp. 1322-1336) (Year: 2021).*
(Continued)

*Primary Examiner* — Daniel C Washburn
*Assistant Examiner* — Sean E Serraguard
(74) *Attorney, Agent, or Firm* — Jefferson IP Law, LLP

(57) ABSTRACT

An electronic apparatus is provided. The electronic apparatus includes a microphone, a memory storing at least one instruction, and a processor connected to the microphone and the memory configured to control the electronic apparatus, and the processor, by executing the at least one instruction, may, based on receiving a user voice signal
(Continued)

through the microphone, obtain a text corresponding to the user voice signal, identify a plurality of sentences included in the obtained text, identify a domain corresponding to each of the plurality of sentences among a plurality of domains, based on a similarity of a first sentence and a second sentence, among the plurality of sentences, having a same domain being greater than or equal to a threshold value, obtain a third sentence in which the first sentence and the second sentence are combined by using a first neural network model, and perform natural language understanding for the third sentence.

18 Claims, 9 Drawing Sheets

(56) References Cited

U.S. PATENT DOCUMENTS

| | | | |
|---|---|---|---|
| 10,573,312 B1* | 2/2020 | Thomson | G10L 15/22 |
| 10,573,317 B2 | 2/2020 | Kim et al. | |
| 10,713,439 B2 | 7/2020 | Lee et al. | |
| 2002/0128821 A1 | 9/2002 | Ehsani et al. | |
| 2012/0084086 A1* | 4/2012 | Gilbert | G10L 15/26 |
| | | | 704/235 |
| 2016/0306800 A1 | 10/2016 | Son et al. | |
| 2016/0329043 A1* | 11/2016 | Kim | G10L 13/10 |
| 2018/0350353 A1 | 12/2018 | Gruber et al. | |
| 2019/0018838 A1* | 1/2019 | Wu | G06F 40/289 |
| 2019/0213284 A1 | 7/2019 | Anand et al. | |
| 2019/0295536 A1* | 9/2019 | Sapugay | G10L 15/19 |
| 2019/0371332 A1 | 12/2019 | Yu et al. | |
| 2020/0026959 A1 | 1/2020 | Lee et al. | |
| 2020/0193217 A1 | 6/2020 | Shen et al. | |
| 2020/0286477 A1 | 9/2020 | Jaygarl et al. | |
| 2020/0342060 A1 | 10/2020 | Park et al. | |
| 2021/0097990 A1 | 4/2021 | Kim et al. | |
| 2023/0130974 A1* | 4/2023 | Yao | G06F 40/30 |
| | | | 704/9 |

FOREIGN PATENT DOCUMENTS

| | | |
|---|---|---|
| KR | 10-1851785 B1 | 6/2018 |
| KR | 10-2019-0118996 A | 10/2019 |
| KR | 10-2020-0010061 A | 1/2020 |
| KR | 10-2020-0123945 A | 11/2020 |

OTHER PUBLICATIONS

International Search Report and Written Opinion dated Dec. 20, 2021, issued in International Patent Application No. PCT/KR2021/012655.

Extended European Search Report dated Apr. 3, 2024, issued in European Patent Application No. 21926888.5.

* cited by examiner

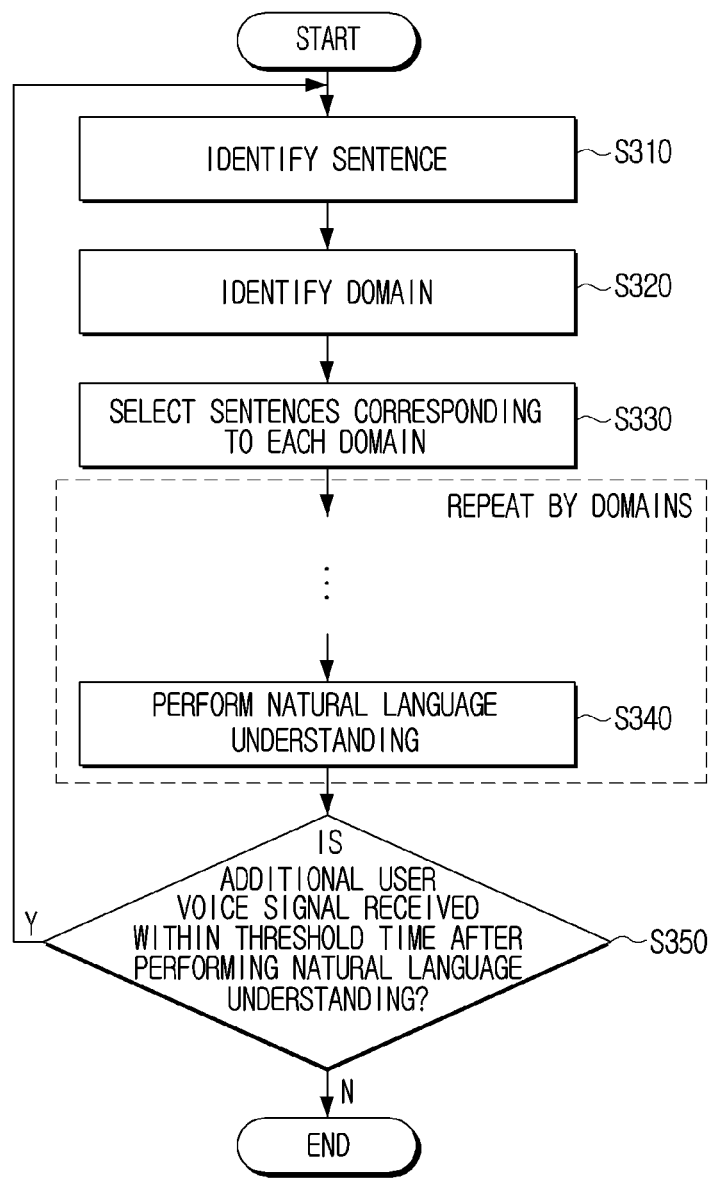

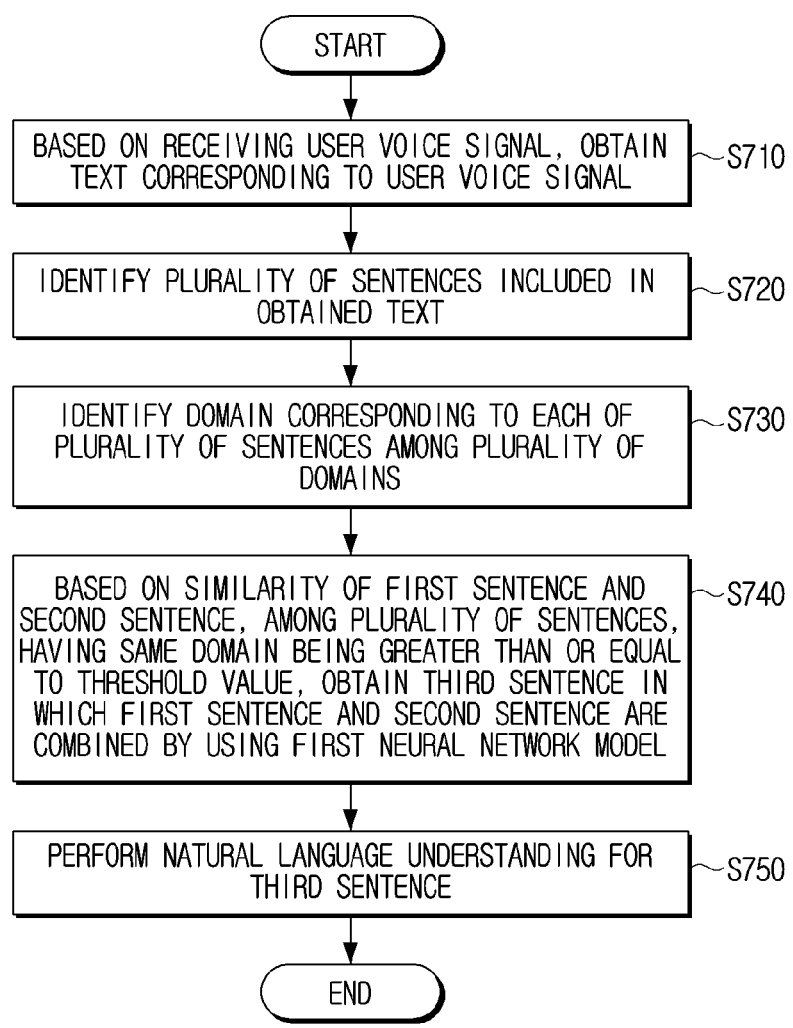

ELECTRONIC APPARATUS AND CONTROL METHOD THEREOF

CROSS-REFERENCE TO RELATED APPLICATION(S)

This application is a continuation application, claiming priority under § 365(c), of an International application No. PCT/KR2021/012655, filed on Sep. 16, 2021, which is based on and claims the benefit of a Korean patent application number 10-2021-0021438, filed on Feb. 17, 2021, in the Korean Intellectual Property Office, the disclosure of which is incorporated by reference herein in its entirety.

BACKGROUND

1. Field

The disclosure relates to an electronic apparatus and a control method thereof. More particularly, the disclosure relates to an electronic apparatus for performing natural language understanding and a control method thereof.

2. Description of the Prior Art

Various types of devices are developed and distributed by development of an electronic technology, and devices operating by the user's voice without physical manipulation of a user have been developed.

When a user voice signal including a plurality of sentences is continuously inputted, it is difficult to independently process a plurality of sentences and thus user intent may not be accurately reflected.

A neural network model which learns a plurality of sentences may be used, but there may be a problem that capacity of the model may get larger and processing speed may get slower.

There may be a case where the user voice signal is not clear. For example, if a plurality of sentences included in a user voice signal include insufficient information or repeat the same intent, there is a possibility of malfunction.

Accordingly, there is a necessity to develop a model that may identify the user's intent more accurately without significantly increasing the amount of computation.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic apparatus which may reduce a computation amount and improve accuracy of natural language understanding in a process of performing natural language understanding, and a control method thereof.

Additional aspects will be set forth in part in the description which follows and, in part, will be apparent from the description, or may be learned by practice of the presented embodiments.

In accordance with an aspect of the disclosure, an electronic apparatus is provided. The electronic apparatus includes a microphone, a memory storing at least one instruction, and a processor connected to the microphone and the memory configured to control the electronic apparatus, and the processor, by executing the at least one instruction, may, based on receiving a user voice signal through the microphone, obtain a text corresponding to the user voice signal, identify a plurality of sentences included in the obtained text, identify a domain corresponding to each of the plurality of sentences among a plurality of domains, based on a similarity of a first sentence and a second sentence, among the plurality of sentences, having a same domain being greater than or equal to a threshold value, obtain a third sentence in which the first sentence and the second sentence are combined by using a first neural network model, and perform natural language understanding for the third sentence.

The processor is further configured to identify a first entity corresponding to the first sentence based on a domain of the first sentence, identify a second entity corresponding to the second sentence based on a domain of the second sentence, and obtain a similarity of the first sentence and the second sentence based on the first sentence, the second sentence, the first entity, and the second entity by using a second neural network model.

The processor is further configured to, based on a similarity of the first sentence and the second sentence being greater than or equal to the threshold value, identify whether the first entity and the second entity are identical, based on the first entity and the second entity not being identical, obtain the third sentence using the first neural network model and perform natural language understanding for the third sentence, and based on the first entity and the second entity being identical, perform natural language understanding for each of the first sentence and the second sentence.

The processor is further configured to, based on the first entity and the second entity being identical and a preset text being included between the first sentence and the second sentence, perform natural language understanding for one of the first sentence and the second sentence based on a reception order of the first sentence and the second sentence.

The processor is further configured to, based on the similarity being less than the threshold value, perform natural language understanding for each of the first sentence and the second sentence.

The processor is further configured to identify a first entity corresponding to the first sentence based on a domain of the first sentence, identify a second entity corresponding to the second sentence based on a domain of the second sentence, and obtain the third sentence based on the first sentence, the second sentence, the first entity, and the second entity using the first neural network model.

The processor is further configured to identify the first sentence based on a reception order of the plurality of sentences and identify the second sentence based on the domain of the first sentence.

The processor is further configured to identify the plurality of sentences from the obtained text using a third neural network model, and identify a domain corresponding to each of the plurality of sentences using a fourth neural network model.

The processor is further configured to, based on receiving an additional user voice signal within a threshold time after natural language understanding for the third sentence is completed, obtain an additional text corresponding to the additional user voice signal, identify a plurality of additional sentences included in the obtained additional text, identify a domain corresponding to each of the plurality of additional sentences among a plurality of domains, and update the third sentence based on the plurality of sentences and sentences having a same domain among the plurality of additional sentences.

The processor is further configured to perform only natural language understanding for at least one sentence among the plurality of sentences based on a priority of a plurality of domains corresponding to each of the plurality of sentences, or sequentially perform natural language understanding for entirety of the plurality of sentences based on an order of a sentence corresponding to each of the plurality of domains.

In accordance with another aspect of the disclosure, a control method of an electronic apparatus is provided. The control method includes, based on receiving a user voice signal, obtaining a text corresponding to the user voice signal, identifying a plurality of sentences included in the obtained text, identifying a domain corresponding to each of the plurality of sentences among a plurality of domains, based on a similarity of a first sentence and a second sentence, among the plurality of sentences, having a same domain being greater than or equal to a threshold value, obtaining a third sentence in which the first sentence and the second sentence are combined by using a first neural network model, and performing natural language understanding for the third sentence.

The obtaining the third sentence comprises identifying a first entity corresponding to the first sentence based on a domain of the first sentence, identifying a second entity corresponding to the second sentence based on a domain of the second sentence, and obtaining a similarity of the first sentence and the second sentence based on the first sentence, the second sentence, the first entity, and the second entity by using a second neural network model.

The obtaining the third sentence comprises, based on a similarity of the first sentence and the second sentence being greater than or equal to the threshold value, identifying whether the first entity and the second entity are identical, based on the first entity and the second entity not being identical, obtaining the third sentence using the first neural network model and performing natural language understanding for the third sentence, wherein the control method further comprises based on the first entity and the second entity being identical, performing natural language understanding for each of the first sentence and the second sentence.

The performing natural language understanding for each of the first sentence and the second sentence comprises, based on the first entity and the second entity being identical and a preset text being included between the first sentence and the second sentence, performing natural language understanding for one of the first sentence and the second sentence based on a reception order of the first sentence and the second sentence.

The method further comprising, based on the similarity being less than the threshold value, performing natural language understanding for each of the first sentence and the second sentence.

According to various embodiments, the electronic apparatus may combine a plurality of similar sentences to one sentence and perform natural language understanding for one sentence, thereby reducing an execution time and improving accuracy according to a plurality of sentence combinations.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a flowchart illustrating an example of receiving an additional user voice signal according to an embodiment of the disclosure;

FIG. 7 is a flowchart illustrating a method of controlling an electronic apparatus according to an embodiment of the disclosure.

Throughout the drawings, like reference numerals will be understood to refer to like parts, components, and structures.

DETAILED DESCRIPTION

Figure 1:
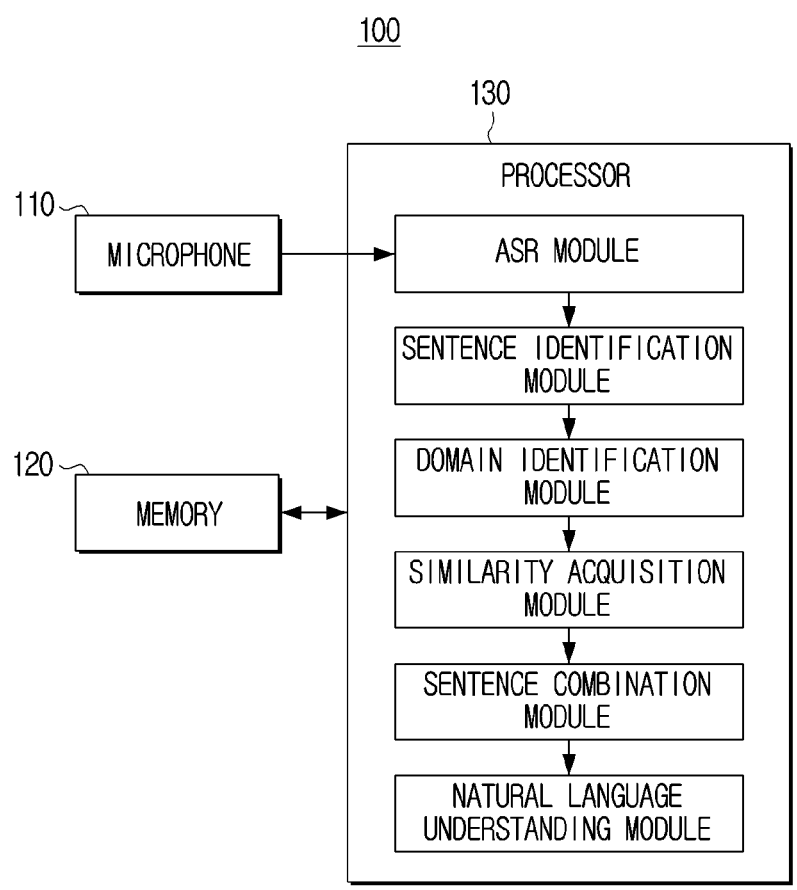
FIG. 1 is a block diagram of an example hardware configuration of an electronic apparatus 100 according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments of the disclosure may be diversely modified. Accordingly, specific embodiments are illustrated in the drawings and are described in detail in the detailed description. However, it is to be understood that the disclosure is not limited to a specific embodiment, but includes all modifications, equivalents, and substitutions without departing from the scope and spirit of the disclosure. Also, well-known functions or constructions are not described in detail since they would obscure the disclosure with unnecessary detail.

The terms used in the present specification and the claims are general terms identified in consideration of the functions of the various embodiments of the disclosure. However, these terms may vary depending on intention, technical interpretation, emergence of new technologies, and the like of those skilled in the related art. Some terms may be selected by an applicant arbitrarily, and the meaning thereof will be described in the detailed description. Unless there is a specific definition of a term, the term may be construed based on the overall contents and technological understanding of those skilled in the related art.

In this specification, the expressions "have," "may have," "include," or "may include" and the like represent presence of a corresponding feature (for example: components such as numbers, functions, operations, or parts) and does not exclude the presence of additional feature.

The expression "At least one of A or/and B" should be understood to represent "A" or "B" or any one of "A and B."

As used herein, the terms "first," "second," and the like may denote various components, regardless of order and/or importance, and may be used to distinguish one component from another, and does not limit the components.

It is to be understood that the terms such as "comprise" or "consist of" are used herein to designate a presence of a characteristic, number, operation, element, component, or a combination thereof, and not to preclude a presence or a possibility of adding one or more of other characteristics, numbers, operations, elements, components or a combination thereof.

In this disclosure, a term user may refer to a person using an electronic apparatus or an apparatus (for example: artificial intelligence (AI) electronic apparatus) that uses an electronic apparatus.

Hereinafter, embodiments of the disclosure will be described in detail with reference to the accompanying drawings.

FIG. 1 is a block diagram of an example hardware configuration of an electronic apparatus according to an embodiment of the disclosure.

Referring to FIG. 1, An electronic apparatus 100 is an apparatus for performing speech recognition and natural language understanding of a user voice signal, including a microphone, such as a smartphone, a tablet personal computer (PC), a desktop PC, a notebook, a smart watch, a set-top box (STB), a speaker, a computer body, etc., and performing speech recognition and natural language understanding of the user voice signal received through the microphone.

The electronic apparatus 100 may be an apparatus which does not include a microphone such as a television (TV), a video wall, a large format display (LFD), a digital signage, a digital information display (DID), a projector display, a digital video disc (DVD) player, a monitor, a smart glasses, receives a user voice signal through wired or wireless communication from another electronic apparatus such as a remote control device, and an apparatus for performing voice recognition and natural language understanding for the user voice signal.

The electronic apparatus 100 is not limited thereto and may be any apparatus capable of performing at least one of voice recognition or natural language understanding of a user voice signal.

The electronic apparatus 100 includes a microphone 110, a memory 120 and a processor 130. However, embodiments in accordance with this disclosure are not limited thereto, and the electronic apparatus 100 may be implemented as a type to exclude some configurations.

The microphone 110 is configured to receive sound and convert the sound into an audio signal. The microphone 110 is electrically connected to the processor 130 and may receive sound by control of the processor 130. The sound may include sound generated in at least one of the electronic apparatus 100 or other electronic apparatuses around the electronic apparatus 100, and noise around the electronic apparatus 100.

For example, the microphone 110 may be integrally formed as an integral unit on an upper side, a front side direction, a side direction, and the like of the electronic apparatus 100. The microphone 110 may be provided in a remote controller, and the like, separate from the electronic apparatus 100. The remote controller may receive sound through the microphone 110 and may provide the received sound to the electronic apparatus 100.

The microphone 110 may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, and the like.

The microphone 110 may be implemented in a type of a sound sensor and may be any configuration that can collect sound.

The memory 120 may refer to a hardware that stores information such as data as an electric or magnetic form so that the processor 130, and the like, may access, and the memory 120 may be implemented as at least one hardware among a non-volatile memory, a volatile memory, a flash memory, a hard disk drive (HDD) or solid state drive (SSD), random access memory (RAM), read-only memory (ROM), and the like.

The memory 120 may store at least one instruction, program, or data used for operation of the electronic apparatus 100 or the processor 130. The instruction is a code unit that directs the operation of the electronic apparatus 100 or the processor 130, and may be written in a machine language that may be understood by a computer. A module may be an instruction set of a series of instructions that perform a particular task of a task unit.

The memory 120 may store data which is information in bit unit or byte unit that may represent characters, numbers, images, and the like. For example, the memory 120 may store data for various modules to process a user voice signal received through the microphone 110.

At least one neural network model to process a user voice signal may be stored in the memory 120. The neural network model may include a plurality of neural network layers. Each of the layers includes a plurality of weight values, and may perform a neural network processing operation through an iterative operation leveraging results of a previous layer and a plurality of weight values. Examples of a neural network includes a convolutional neural network (CNN), a deep neural network (DNN), a recurrent neural network (RNN), a restricted Boltzmann machine (RBM), a deep belief network (DBN), a bidirectional recurrent deep neural network (BRDNN), a deep Q-networks, and the like. In the disclosure, various neural network may be used in addition to the neural networks mentioned. The neural network model may be configured with an ontology-based data structure which is represented as a format in which various concepts, conditions, relations, or agreed-upon knowledge are represented as a format processible by computer.

The neural network model may be trained through a separate server and/or system or the electronic apparatus 100 using various learning algorithms. Learning algorithm is a method of training a predetermined target device (e.g., robot) using an enough learning data so that the predetermined target device can make a decision or prediction by itself. Examples of learning algorithms include, but are not limited to, supervised learning, unsupervised learning, semi-supervised learning, or reinforcement learning, and various learning algorithms that may be used.

The memory 120 may be accessed by the processor 130, and reading/writing/modifying/updating of data by the processor 130 may be performed associated with the instructions, modules, neural network model or data.

The processor 130 may control overall operations of the electronic apparatus 100. The processor 130 may be connected to each configuration of the electronic apparatus 100 to control overall operations of the electronic apparatus 100. For example, the processor 130 may be connected to the microphone 110, the memory 120, a communication interface (not shown), and the like, for controlling the operation of the electronic apparatus 100.

The processor 130 according to an embodiment may be implemented with a digital signal processor (DSP), a microprocessor, and a time controller (TCON), and the like, but the processor is not limited thereto. The processor 130 may include, for example, and without limitation, one or more among a central processing unit (CPU), a micro controller unit (MCU), a microprocessor unit (MPU), a controller, an application processor (AP), a communication processor (CP), an advanced reduced instruction set computing (RISC) machine (ARM) processor, a dedicated processor, or may be defined as a corresponding term. The processor 130 may be implemented in a system on chip (SoC) type or a large scale integration (LSI) type which a processing algorithm is built therein, application specific integrated circuit (ASIC), or in a field programmable gate array (FPGA) type.

Referring to FIG. 1, that a plurality of modules are located within the processor 130 is to indicate that a plurality of modules are loaded (or executed) by the processor 130 and operated in the processor 130, and the plurality of modules may be pre-stored in the memory 120.

The processor 130 may control the overall operation of the electronic apparatus 100 by executing a module or instructions stored in the memory 120. Specifically, the processor 130 may determine a sequence for data processing by reading and interpreting modules or instructions and controlling the operation of other configurations by transmitting a control signal which controls the operation of other configurations, such as the memory 120.

The processor 130 may obtain text corresponding to the user voice signal received through the microphone 110 by executing an automatic speech recognition (ASR) module. The processor 130 may identify a plurality of sentences included in the obtained text by executing the sentence identification module. The ASR module may receive the user voice signal and output text corresponding to the user voice signal, and the sentence identification module may receive the text and output the plurality of sentences.

For example, if the user utters "Hi, Bixby, I need to get up early the day after tomorrow. I will set an alarm to 7 o'clock in the morning. Oh, I am hungry. Will it be sunny tomorrow?", the processor 130 may wake up according to the user utterance of "Hi, Bixby." The processor 130, based on receiving the user voice signal "I need to get up early the day after tomorrow. I will set an alarm to 7 o'clock in the morning. Oh, I am hungry. Will it be sunny tomorrow?" through the microphone 110, may obtain a text corresponding to the user voice signal, and may identify, from the obtained texts, four sentences of "I need to get up early the day after tomorrow", "I will set an alarm to 7 o'clock in the morning," "Oh, I am hungry," "Will it be sunny tomorrow?". The sentence is a minimum unit representing the completed content, and the processor 130 may identify a sentence based on at least one of a descriptor, a sentence structure, or a sentence length. However, the embodiment is not limited thereto, and the processor 130 may identify a sentence based on a punctuation mark, such as a period, exclamation, question mark, and the like. Alternatively, the processor 130 may identify a sentence based on a bundle section (time, length, etc.) between the sentences. Alternatively, the processor 130 may receive the text itself and identify the sentence from the received text, instead of receiving a user voice signal and obtaining a text through the ASR module.

The sentence identification module may be implemented as a third neural network model. For example, the processor 130 may identify a plurality of sentences from the text obtained using the third neural network model. The third neural network model may be a model obtained by learning sample texts and sample sentences included in a plurality of sample texts.

The processor 130 may identify a domain corresponding to each of the plurality of sentences by executing the domain identification module. In the example described above, the processor 130 may identify "I need to get up early the day after tomorrow" and "I will set an alarm to 7 o'clock in the morning," as an alarm domain, and may identify "Will it be sunny tomorrow?" as a weather domain. The processor 130 may identify "Oh, I'm hungry" as out of domain (OOD) without the domain. The domain identification module may sequentially receive a plurality of sentences and output a domain of the received sentence along with the received sentence. According to an example of the domain identification module, "Oh, I'm hungry" may be identified as a domain, such as a delivery or cooking recipe. That is, the OOD without the domain may include a case where the domain identification module is not supported.

The domain identification module may be implemented as a fourth neural network model. For example, the processor 130 may identify a domain corresponding to each of the plurality of sentences using a fourth neural network model. The fourth neural network model may be a model obtained by learning a domain corresponding to a plurality of sample sentences and a plurality of sample sentences.

The processor 130 may obtain the similarity between the first sentence and the second sentence having the same domain among the plurality of sentences by executing the similarity acquisition module, obtain a third sentence in which the first sentence and the second sentence are combined by executing the sentence combination module if the obtained similarity is greater than or equal to a threshold value, and perform a natural language understanding module by executing the natural language understanding module. The similarity acquisition module may receive the sentences having the same domain, output the sentences having the same domain and similarity of the same sentences, the sentence combination module may receive the same sentences and the similarity of the same sentences, output the combined sentence, and the natural language understanding module may receive the combined sentence and output a natural language understanding result corresponding to the combined sentence. A threshold value may be variable. For example, the threshold may be variably determined based on the development direction, policy, implementation method, and the like.

In the above-described example, the processor 130, by executing a similarity acquisition module, may obtain the similarity between "I need to get up early the day after tomorrow" and "I will set an alarm to 7 o'clock in the morning," having the same domain of alarm. If the obtained similarity is greater than or equal to the threshold, the processor 130, by executing the sentence combination module, may obtain "I will set an alarm at 7 in the morning of the day after tomorrow" in which "I need to get up early the day after tomorrow" and "I will set an alarm to 7 o'clock in the morning" are combined. The processor 130 may execute the natural language understanding module and may perform natural language understanding about "I will set an alarm at 7 in the morning of the day after tomorrow".

The sentence combination module is implemented as a first neural network model, and the processor 130 may use the first neural network model to obtain "I will set an alarm at 7 in the morning of the day after tomorrow" in which "I need to get up early the day after tomorrow" and "I will set an alarm to 7 o'clock in the morning" are combined. The first neural network model may be a model trained based on a sample combination sentence corresponding to a plurality of sample sentences and a plurality of sample sentences.

Alternatively, the processor 130 may use the rule-based sentence combination module to obtain "I will set an alarm at 7 in the morning of the day after tomorrow" in which "I need to get up early the day after tomorrow" and "I will set an alarm to 7 o'clock in the morning" are combined.

The similarity acquisition module may be implemented as a second neural network model. For example, the processor 130 may obtain the similarity between the first sentence and the second sentence having the same domain using the second neural network model. The processor 130 may divide each sentence into a plurality of tokens using various methods such as morpheme units, syllable units, etc., according to the features of each language, convert the plurality of tokens into a preset high-dimensional embedding value, and input the embedding value to the second neural network model to obtain the similarity of the first sentence and the second sentence. The second neural network model may be a model trained based on a plurality of sample sentences and sample similarity. The sample similarity may consider an intent of sentences in a similarity setting process. For example, although the similarity of the sentence itself is high, the sample similarity may be set low if the intent is different. For example, as for "please set an alarm," and "please delete an alarm", similarity of sentences is high, but intent is different so that the low similarity may be set. The sample similarity is obtained on the basis of the similarity of the sentence itself, but the similarity may be individually adjusted when the intent is different. Accordingly, the similarity obtained by using the second neural network model may be a result of including the intents of sentences.

The embodiment is not limited thereto, and the token may be divided based on spacing, and various methods may be applied to the token. In addition, the embedding vector corresponding to the token may also have a different value depending on the initial setting.

It has been described that the similarity acquisition module receives the sentences having the same domain, and the similarity acquisition module may receive a plurality of sentences, and may directly identify the sentences having the same domain.

By performing natural language understanding by combining a plurality of sentences, the processor 130 may improve accuracy of natural language understanding.

The processor 130 may identify a first entity corresponding to the first sentence based on a domain of the first sentence, identify a second entity corresponding to the second sentence based on a domain of the second sentence, and identify a similarity of the first sentence and the second sentence by further considering the first entity and the second entity. In this case, the similarity acquisition module may identify an entity corresponding to the sentence. Alternatively, the processor 130 may identify an entity corresponding to the sentence by executing an entity extractor separately from the similarity acquisition module. Hereinafter, the processor 130 is described as identifying an entity, and using a similarity acquisition module or an entity extractor will be omitted.

The processor 130 may obtain the similarity of the first sentence and the second sentence based on the first sentence, the second sentence, the first entity, and the second entity, by using the second neural network model.

In the above example, the processor 130 may identify date entity from "the day after tomorrow" based on the alarm domain of "I need to get up early the day after tomorrow" and may identify a time entity from "7 o'clock in the morning" based on the alarm domain "I will set an alarm to 7 o'clock in the morning". The alarm domain may include the date entity, the time entity, and the like. The processor 130 may identify the entity contained in the sentence of a plurality of entities corresponding to the alarm domain.

The processor 130, by using a second neural network model, may obtain the similarity of the two sentences based on the "I need to get up early the day after tomorrow" and "I will set an alarm to 7 o'clock in the morning", based on the date entity and time entity. The second neural network model may be a model trained on the basis of a plurality of sample sentences, entities of each of the plurality of entities, and the sample similarity.

In this example, even if there is an expression that is not directly used in learning, the similarity in which the expression is reflected may be obtained through an entity corresponding to that expression. For example, from the sentence "please set an alarm two days after tomorrow", even if the expression "two days after tomorrow" is not trained, in the case of an entity extractor, it is also possible to identify the date entity from "two days after tomorrow", in which case the date entity is reflected in the similarity acquisition process to obtain similarity with a higher reliability.

The processor 130 may, based on a similarity of the first sentence and the second sentence being greater than or equal to the threshold value, identify whether the first entity and the second entity are identical, based on the first entity and the second entity not being identical, obtain the third sentence using the first neural network model and perform natural language understanding for the third sentence, and based on the first entity and the second entity being identical, perform natural language understanding for each of the first sentence and the second sentence.

In the above-described example, since the entities of the two sentences are not the same, the processor 130 may use the first neural network model to obtain "I will set an alarm to 7 o'clock in the morning" and may perform natural language understanding for "I will set alarm at 7 o'clock in the morning the day after tomorrow. Alternatively, the processor 130, when receiving a user voice signal such as "I will set an alarm to 7 o'clock in the morning" and "I will set an alarm at 9 o'clock in the morning as well,", the entity of two sentences is the same as the time entity, and the processor 130 may process two sentences separately.

The processor 130 may, based on the first entity and the second entity being identical and a preset text being included between the first sentence and the second sentence, perform natural language understanding for one of the first sentence and the second sentence based on a reception order of the first sentence and the second sentence.

For example, if the user voice signal such as "please set an alarm to 9 o'clock," "No," "please set an alarm to 8 o'clock," the processor 130 may perform natural language understanding only for "please set an alarm to 8 o'clock" which is received later between two sentences, since the entity of two sentences is the same as the time entity but the preset text such as "no" is included between two sentences, and may not perform natural language understanding for "please set an alarm to 9 o'clock."

The preset text may be a text of an intent to deny previous utterance such as "no," and "please cancel" and the like.

The processor 130 may, based on the similarity being less than the threshold value, perform natural language understanding for each of the first sentence and the second sentence.

The processor 130 may identify a first entity corresponding to the first sentence based on a domain of the first sentence, identify a second entity corresponding to the second sentence based on a domain of the second sentence, and obtain a third sentence based on the first sentence, the second sentence, the first entity, and the second entity using the first neural network model. The method of obtaining an entity is the same as described above, and the first neural network model may be a model trained based on a plurality of sample sentences, entities of each of a plurality of sample sentences, and a sample combination sentence corresponding to a plurality of sample sentences. The processor 130 may obtain a combined sentence in consideration of entities of sentences.

The processor 130 may identify the first sentence based on the order of receiving a plurality of sentences and may identify the second sentence based on the domain of the first sentence.

For example, if the user voice signal such as "I need to get up early the day after tomorrow. I will set an alarm to 7 o'clock in the morning. Oh, I am hungry. Will it be sunny tomorrow?" is received, the processor 130 may identify "I need to get up early the day after tomorrow" which is received first as the first sentence and may identify "I will set an alarm to 7 o'clock in the morning" having the same alarm domain as the first sentence as the second sentence.

The processor 130 may identify the sentence having a closest timing of utterance as the first sentence as the second sentence, if there are a plurality of sentences having the same domain as the first sentence.

When the additional user voice signal is received within the threshold time after the natural language understanding about the third sentence is completed, the processor 130 may obtain an additional text corresponding to an additional user voice signal, identify a plurality of additional sentences included in the obtained additional text, identify a domain corresponding to each of the plurality of additional sentences among the plurality of domains, and update the third sentence based on the sentences having the same domain among the plurality of sentences and the plurality of additional sentences.

The processor 130 may process the first received user voice signal and the additional user voice signal as one user voice signal when the additional user voice signal is received within the threshold time after the natural language understanding about the third sentence is completed. The processor 130 may combine a sentence included in the first received user voice signal and a sentence included in the additional user voice signal, and may perform a natural language understanding for the combined sentence.

The processor 130 may perform natural language understanding of at least one sentence among the plurality of sentences based on priority of a plurality of domains corresponding to each of the plurality of sentences, or sequentially perform a natural language understanding about the entire plurality of sentences based on the order of sentences corresponding to each of the plurality of domains.

For example, when receiving a user voice signal such as "I need to get up early the day after tomorrow. I will set an alarm to 7 o'clock in the morning. Oh, I am hungry. Will it be sunny tomorrow?", the processor 130 may combine "I need to get up early the day after tomorrow" and "I will set an alarm to 7 o'clock in the morning" and may perform only natural language understanding for the combined sentence, based on the alarm domain which has the highest priority among the plurality of domains corresponding to each of the plurality of sentences.

Alternatively, based on receiving a user voice signal such as "I need to get up early the day after tomorrow. Oh, I am hungry. Will it be sunny tomorrow? I will set an alarm to 7 o'clock in the morning", the processor 130 may identify a domain of a plurality of sentences and may sequentially perform natural language understanding.

The processor 130 may process "I will set an alarm to 7 o'clock in the morning" having the same alarm domain as "I need to get up early the day after tomorrow" first and then may process "will it be sunny tomorrow?" which is the weather domain. In this example, the processor 130 may not process "Oh, I am hungry" which corresponds to OOD. However, the embodiment is not limited thereto, and the processor 130 may process the OOD after processing for all domains.

As described above, if the similarity of the same sentences is greater than or equal to a threshold value, the processor 130 may combine the same sentences into one sentence, and perform a natural language understanding for one sentence to improve the accuracy of the natural language understanding.

Figure 2:
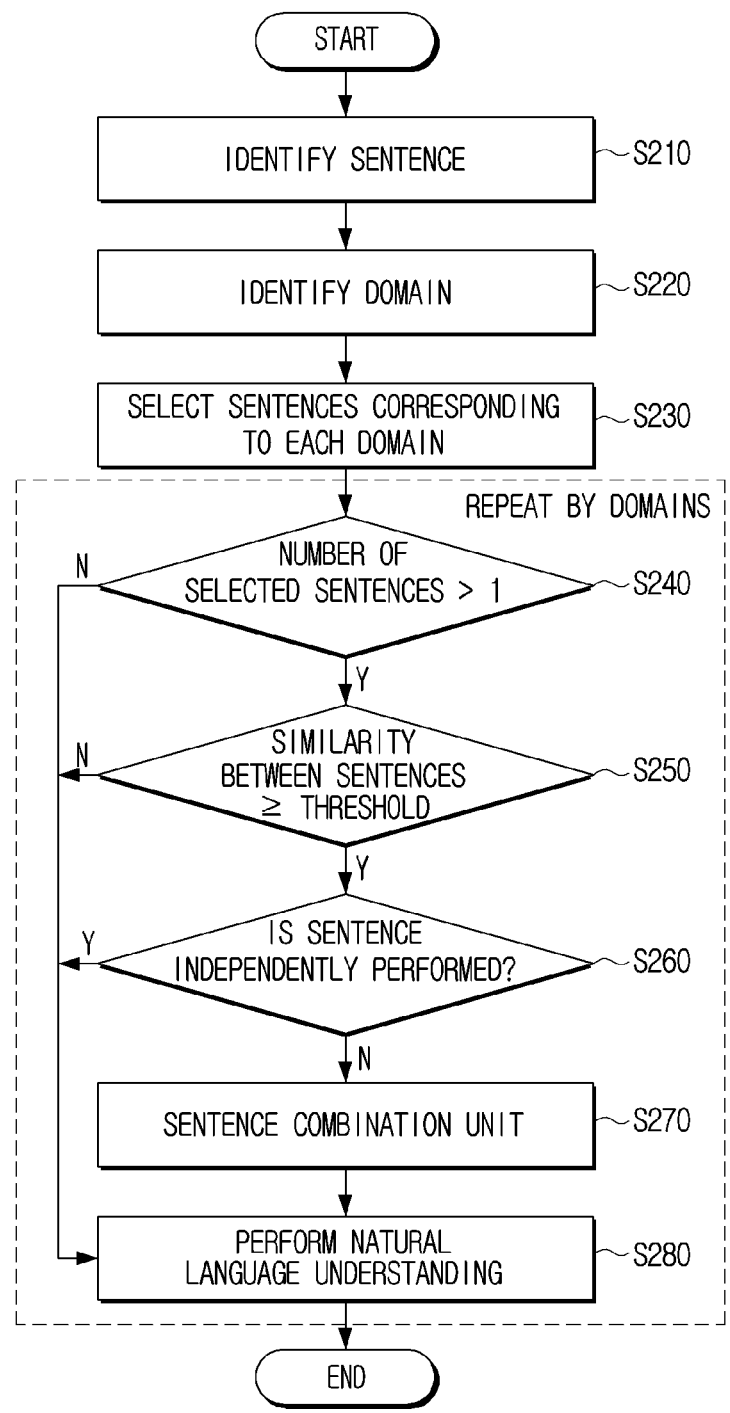
FIG. 2 is a flowchart illustrating a method of natural language understanding for a combined sentence according to an embodiment of the disclosure.

FIG. 2 is a flowchart illustrating a method of natural language understanding for a combined sentence according to an embodiment of the disclosure.

Referring to FIG. 2, first, the processor 130 may identify a sentence from text in operation S210. For example, the processor 130 may identify a sentence from text using a third neural network model. However, the embodiment is not limited thereto and the processor 130 may identify a sentence from the text by using the rule-based sentence identification module. For example, the processor 130 may identify a sentence from the text in a manner that senses the descriptor.

The processor 130 may identify a domain of a plurality of sentences in operation S220. For example, the processor 130 may identify a domain of each of the plurality of sentences using a fourth neural network model. The embodiment is not limited thereto, and the processor 130 may identify a domain of the plurality of sentences based on a database associated with the domain. For example, the electronic apparatus 100 may store a database including words for each domain, and the processor 130 may identify a domain corresponding to a word included in the sentence.

The processor 130 may select a sentence for each domain in operation S230, perform a natural language understanding for the selected sentence in operation S280 if the number of selected sentences is one in operation S240—No, and may identify the similarity between the sentences if the number of selected sentences is plural in operation S240—Yes.

The processor 130 may identify similarity using the second neural network model and may identify similarity by further using entity of each sentence.

If the similarity between the plurality of sentences is less than the threshold value in operation S250—No, the processor 130 may perform a natural language understanding for each of the plurality of sentences in operation S280, and if the similarity is greater than or equal to the threshold value in operation S250—Yes, the processor 130 may identify whether the plurality of sentences are independently performed.

For example, the processor 130 may identify that a plurality of sentences are independently executable if the entities of the plurality of sentences are the same, and may identify that the plurality of sentences are not independently performed if the entity is not the same.

If it is identified that a plurality of sentences are performed independently in operation S260—Yes, the processor 130 may perform natural language understanding for a plurality of sentences in operation S280.

If it is identified that the plurality of sentences are not independently performed in operation S260—No, the processor 130 may combine the plurality of sentences into one sentence in operation S270. For example, the processor 130 may combine the plurality of sentences into one sentence using the first neural network model if the plurality of sentences are identified not to be performed independently in operation S260—No.

The embodiment is not limited thereto, and the processor 130 may combine a plurality of sentences into one sentence by using the rule-based sentence combination module. For example, the processor 130 may delete a word corresponding to the same entity in each of the plurality of sentences from a portion of the plurality of sentences and combine the rest to obtain one sentence.

The processor 130 may perform natural language understanding for the combined sentence in operation S280.

The operations S240 to S280 may be repeated for each domain. For example, if the plurality of sentences are divided into an alarm domain and a weather domain, the processor 130 may perform operations S240 to S280 with respect to the alarm domain, and may perform operations of S240 to S280 with respect to the weather domain. At this time, the processor 130 may determine the order of domains for performing operations of S240 to S280 based on the number of sentences included in each domain or the order of the sentences.

It has been described that first to fourth neural network models are used, and each neural network model may be stored in the electronic apparatus 100 or an external server. When each neural network model is stored in the electronic apparatus 100, the processor 130 may directly use the stored neural network model. Alternatively, when each neural network model is stored in an external server, the processor 130 may transmit, to an external server, data to be processed and may receive a neural network computation result from an external server.

Hereinafter, the operation of the electronic apparatus 100 will be described in more detail with reference to FIGS. 3 to 6. Referring to FIGS. 3 to 6, an embodiment will be described for convenience. However, the individual embodiments of FIGS. 3 to 6 may be implemented in a combined state.

FIG. 3 is a flowchart illustrating an example of receiving an additional user voice signal according to an embodiment of the disclosure.

The operation of FIG. 3 which is repeated by domains is the same as FIG. 2 and a detailed description is omitted.

Referring to FIG. 3, first, when a user voice signal is received, the processor 130 may perform a sentence identification in operation S310, a domain identification in operation S320, and a sentence selection in operation S330 corresponding to each domain, and finally perform a natural language understanding in operation S340.

The processor 130 may identify whether an additional user voice signal is received within a threshold time after the natural language understanding is completed in operation S350. The processor 130 may obtain additional texts corresponding to the additional user voice signal when the additional user voice signal is received within a threshold time after natural language understanding is performed, identify a plurality of additional sentences included in the obtained additional text, identify a domain corresponding to each of the plurality of additional sentences among the plurality of domains, and update the third sentence based on the sentences having the same domain among the plurality of sentences and the plurality of additional sentences.

For example, the processor 130 may perform natural language understanding according to a user voice signal, "I need to get up early the day after tomorrow. I will set an alarm to 7 o'clock in the morning. Oh, I am hungry. Will it be sunny tomorrow?" and then if an additional user voice signal "No, I will set an alarm to 8 o'clock" is received within a threshold time, perform natural language by combining "I need to get up early the day after tomorrow," "I will set an alarm to 7 o'clock in the morning," "No", "I will set an alarm to 8 o'clock in the morning" with "I will set an alarm to 8 o'clock in the morning the day after tomorrow". That is, the processor 130 may perform natural language understanding for one sentence.

The processor 130 may perform natural language understanding for "No" and "I will set an alarm to 8 o'clock in the morning" by combining "I need to get up early the day after tomorrow," "I will set an alarm to 7 o'clock in the morning," with "I will set an alarm to 7 o'clock in the morning the day after tomorrow", if an additional user voice signal "No, I will set an alarm to 8 o'clock" is received, after a threshold time from performing natural language understanding according to a user voice signal, "I need to get up early the day after tomorrow. I will set an alarm to 7 o'clock in the morning. Oh, I am hungry. Will it be sunny tomorrow?" In this case, the final operation may be the same as the case where the additional user voice signal is received within the threshold time, but in the former case, a natural language understanding of one sentence may be performed, but in the latter case, a natural language understanding of the two sentences may be performed. Alternatively, according to an embodiment, the meaning of "No" may not be identified, and the alarm at 8 o'clock in the morning may be additionally set according to "I will set an alarm to 8 o'clock in the morning."

Referring to FIG. 3, it is described that whether to receive a voice signal is identified after performing a natural language understanding for convenience of description, but the embodiment is not limited thereto. For example, the processor 130 may identify whether to receive an additional user voice signal after identification of the sentence, and may stop operations repeated for each domain when the additional user voice signal is received. For example, when an additional user voice signal is received during the domain identification operation, the processor 130 may perform a domain identification operation on the first user voice signal and a sentence selection operation corresponding to each domain, and may perform a sentence identification operation for the additional user voice signal, a domain identification operation, and a sentence selection operation corresponding to each domain. The processor 130 may perform operations repeated for each domain with respect to the first user voice signal and the additional user voice signal.

When the additional user voice signal is received while the processor 130 performs a repeated operation for each domain with respect to the first user voice signal, the processor 130 may stop the operation of the first user voice signal, and perform a sentence identification operation for the additional user voice signal, a domain identification operation, and a sentence selection operation corresponding to each domain. The processor 130 may perform again operations repeated for each domain with respect to the first user voice signal and the additional user voice signal.

Figure 4A:
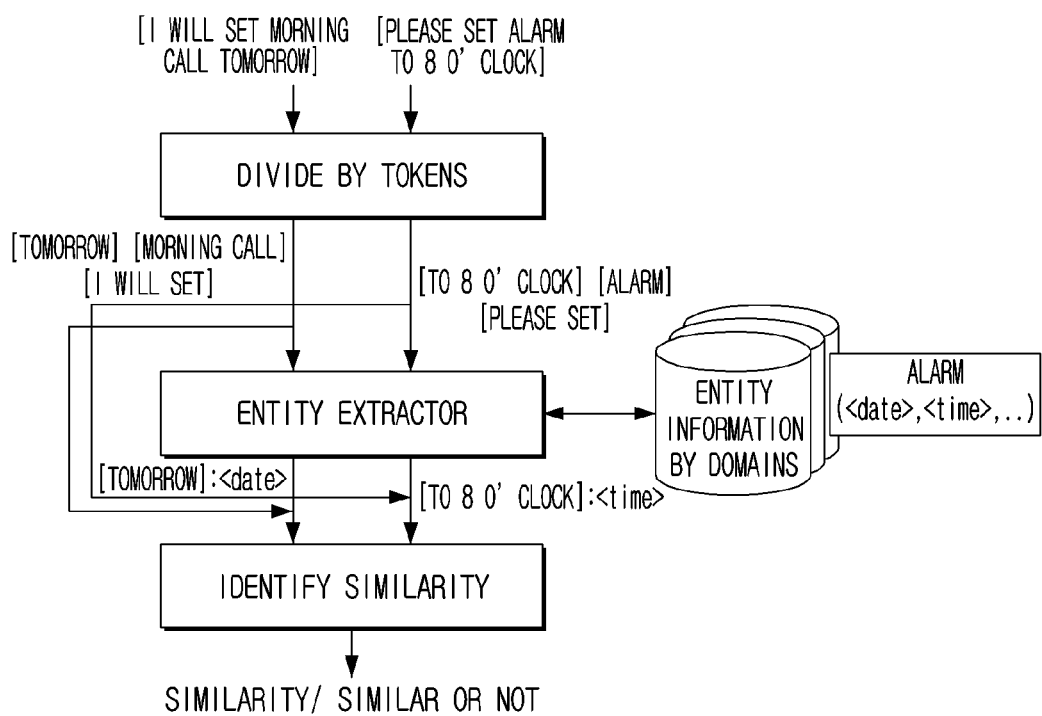
FIG. 4A is a diagram illustrating a similarity acquisition operation according to an embodiment of the disclosure.
Figure 4B:
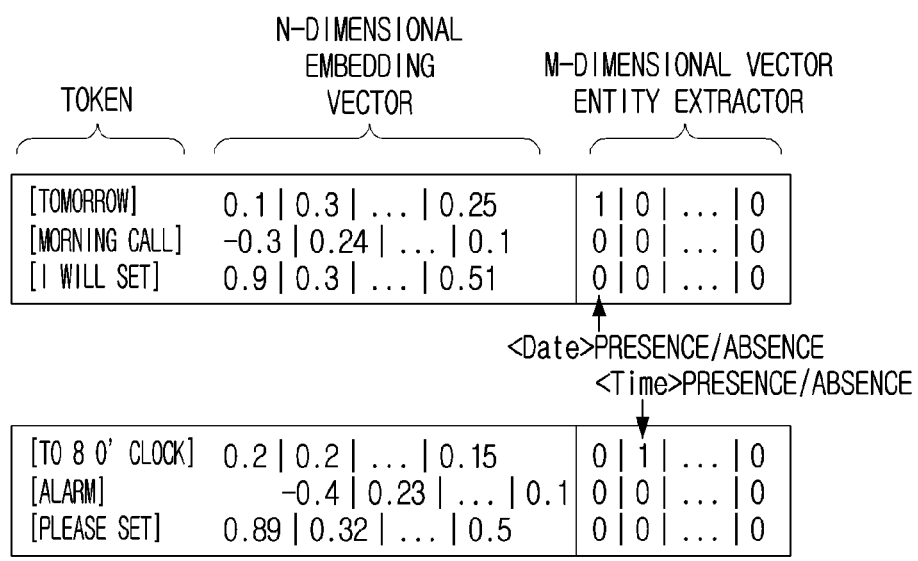
FIG. 4B is a diagram illustrating a similarity acquisition operation according to an embodiment of the disclosure.
Figure 4C:
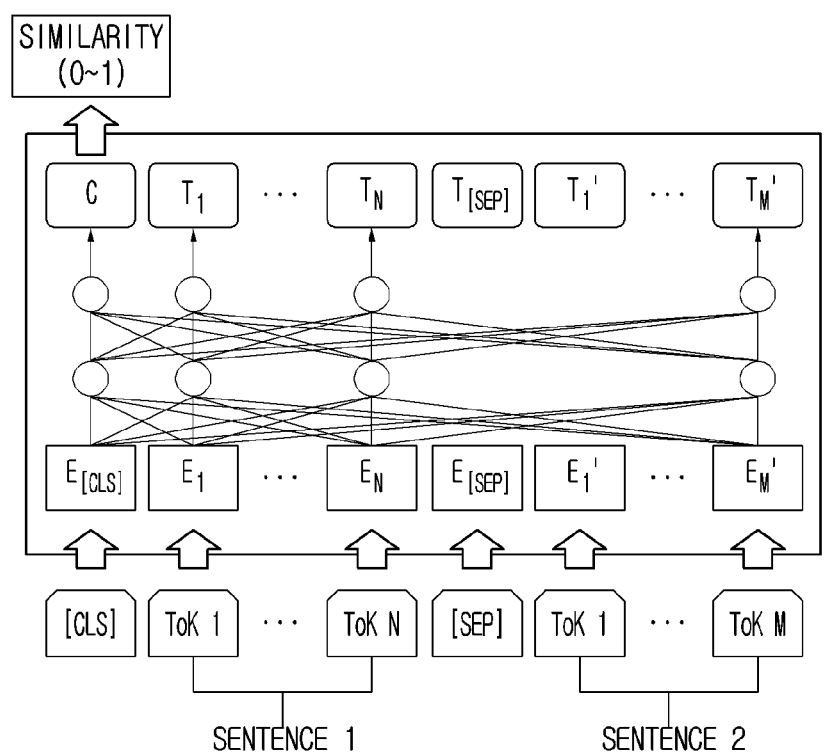
FIG. 4C is a diagram illustrating a similarity acquisition operation according to an embodiment of the disclosure.

FIGS. 4A to 4C are diagrams illustrating a similarity acquisition operation according to various embodiments of the disclosure.

Referring to FIG. 4A, the processor 130 may divide each of "I will set a morning call tomorrow," "please set an alarm to 8 o'clock" having the same alarm domain into a plurality of tokens. For example, the processor 130 may divide "I will set a morning call tomorrow" into "tomorrow", "morning call", and "will set," and may divided "please set an alarm to 8 o'clock" to "8 o'clock", "alarm", and "please set."

The processor 130 may identify the entity from each token using an entity extractor. For example, the memory 120 may store entity information divided for each domain. For example, the alarm domain may include a date entity, a time entity, and the like. The entity extractor uses the entity information classified for each domain, and the processor 130 may identify the "tomorrow" as the date entity and identify "to 8 o'clock" as a time entity.

The processor 130 may identify similarity of a plurality of sentences based on the plurality of sentences and entities included in each of the plurality of sentences.

Referring to FIG. 4B, the processor 130 may convert each of a plurality of tokens to n-dimensional embedding vector, and may convert each of the plurality of entities to m-dimensional vector.

Referring to FIG. 4C, the processor 130 may identify similarity of a plurality of sentences by inputting an n-dimensional embedding vector and an m-dimensional vector into a neural network model. The processor 130 may input a vector representing an embedding vector of "tomorrow" and a corresponding entity into the $E_1$ of Sentence 1. The processor 130 may operate in the same manner for "morning call" and "I will set". The processor 130 may input an embedding vector of "to 8 o'clock" and a vector representing the corresponding entity to $E_1'$ of Sentence 2. The processor 130 may operate in the same manner for "alarm" and "please set."

The processor 130 may identify similarity of a plurality of sentences by the method as shown above.

Although the neural network model of FIG. 4C has been described that m-dimensional vector representing an entity is input along with the token, but the embodiment is not limited thereto. For example, for a neural network model, only a token may be input without an input of an entity, and the neural network model may be used as a lightweight model.

Figure 5:
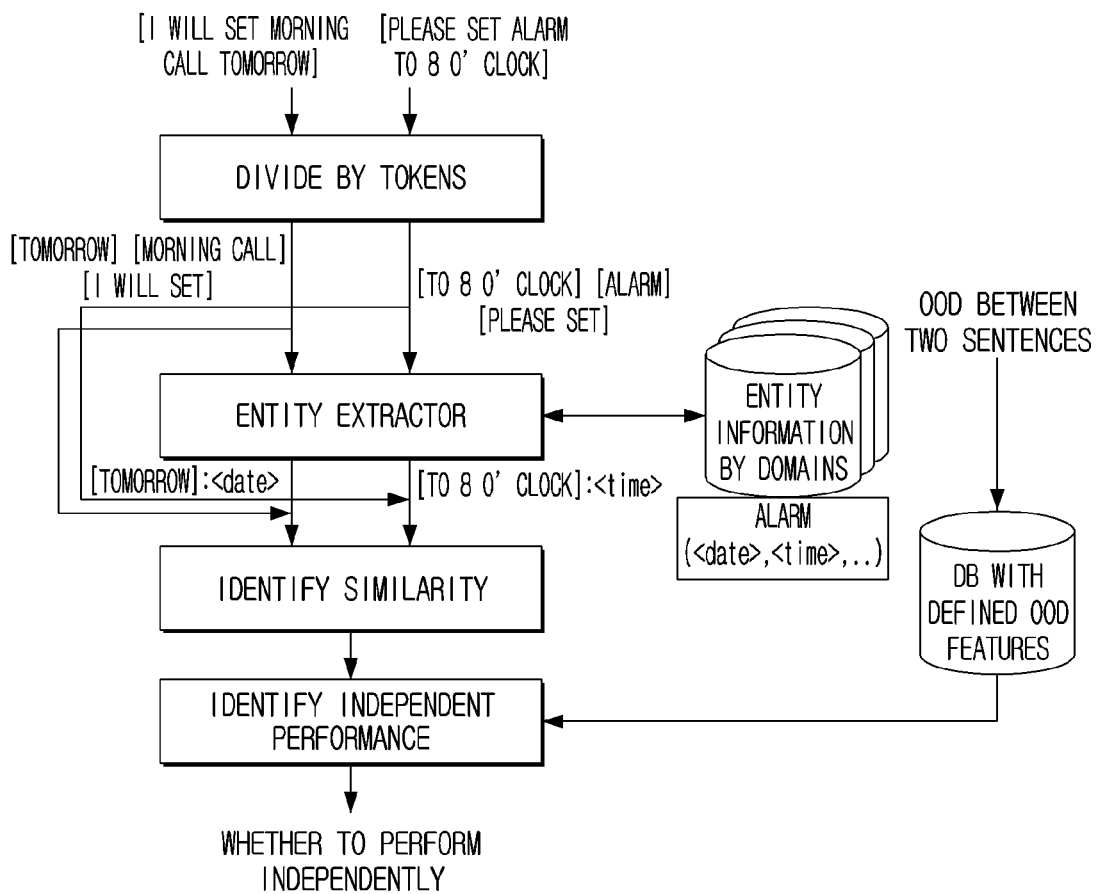
FIG. 5 is a diagram illustrating an operation of independently identifying natural language processing according to an embodiment of the disclosure.

FIG. 5 is a diagram illustrating an operation of independently identifying natural language processing according to an embodiment of the disclosure.

Referring to FIG. 5, when a similarity of a plurality of sentences is less than a threshold value, the processor 130 may perform natural language understanding for each of the plurality of sentences as there is no need to combine two sentences.

If the similarity of the plurality of sentences is greater than or equal to a threshold value, the processor 130 may combine the plurality of sentences and perform a natural language understanding of the combined sentence. However, although the similarity of the plurality of sentences is greater than or equal to a threshold value, the processor 130 may not combine the plurality of sentences. The processor 130 may independently process a plurality of sentences, and this has an assumption that a plurality of sentences are similar.

The processor 130 may identify whether a plurality of entities corresponding to the plurality of sentences are identical when the similarity of the plurality of sentences is greater than or equal to a threshold value, combine the plurality of sentences if the plurality of entities are not the same, and individually process the plurality of sentences without combining the plurality of sentences if the plurality of entities are the same.

For example, when the plurality of sentences are "I need to wake up early the day after tomorrow" and "I will set an alarm to 7 o'clock in the morning", the entities of the sentence are date entity and time entity, which are different from each other, and the processor 130 may combine two sentences to "I will set an alarm to 7 o'clock in the morning the day after tomorrow" and may perform natural language understanding for "I will set an alarm to 7 o'clock in the morning the day after tomorrow. Alternatively, the processor 130 may, if the plurality of sentences are "I will set an alarm to 7 o'clock in the morning" and "I will set an alarm to 9 o'clock in the morning as well," the entities of two sentences are time entity which is the same, the processor 130 may individually process the two sentences.

The processor 130 may perform a natural language understanding for one of the plurality of sentences based on the reception order of the plurality of sentences when the similarity of the plurality of sentences is equal to or greater than the threshold value, the plurality of entities respectively corresponding to the plurality of sentences are the same and a preset text is included between the plurality of sentences.

For example, if the user voice signal such as "please set an alarm to 9 o'clock," "No," "please set to 8 o'clock" is received, the processor 130 may perform natural language understanding only for "please set to 8 o'clock" which is received later between two sentences, as two sentences are similar, the entity of the two sentences is the same as the time entity, and a preset text "No" is included between the two sentences, but may not perform natural language understanding for "please set an alarm to 9 o'clock."

Referring to FIG. 5, the identification of independent performance is described as rule-based, but this may be implemented in a format of including in a neural network model. For example, the processor 130 may input a predetermined text to the neural network model of FIG. 4C as E [SEP] to identify whether two sentences are combined and individually processed.

Figure 6:
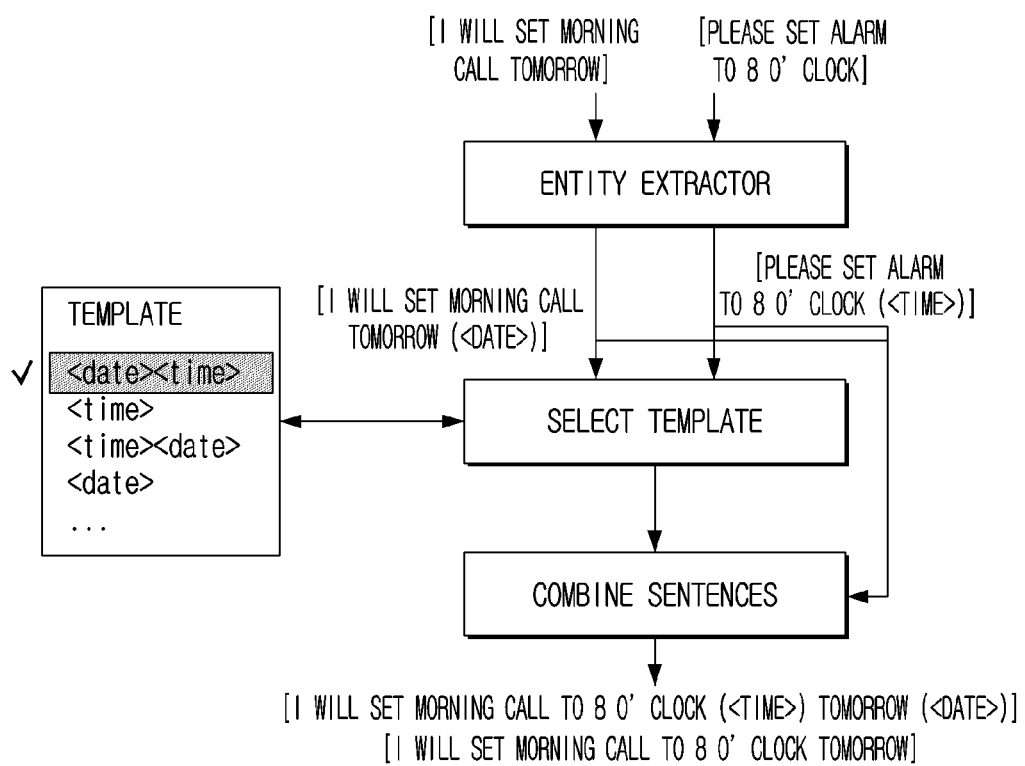
FIG. 6 is a diagram illustrating combination of a plurality of sentences according to an embodiment of the disclosure.

FIG. 6 is a diagram illustrating combination of a plurality of sentences according to an embodiment of the disclosure.

The processor 130 may combine a plurality of sentences using the first neural network model. The embodiment is not limited thereto, and the processor 130 may combine a plurality of sentences by using a rule-based sentence combination module.

The processor 130 may identify entities of each of the plurality of sentences and may combine a plurality of sentences based on a template including all the identified entities among the plurality of templates.

Referring to FIG. 6, for example, the processor 130 may identify the date entity and the time entity from the "I will set a morning call tomorrow" and "please set an alarm to 8 o'clock" and may combine the plurality of sentences to "please set an alarm to 8 o'clock tomorrow" based on the template <date><time> including all the identified entities among the plurality of templates.

FIG. 7 is a flowchart illustrating a method of controlling an electronic apparatus according to an embodiment of the disclosure.

Referring to FIG. 7, the method may include, based on receiving a user voice signal, obtaining a text corresponding to the user voice signal in operation S710 and identifying a plurality of sentences included in the obtained text in operation S720. The method may include identifying a domain corresponding to each of the plurality of sentences among a plurality of domains in operation S730, and based on a similarity of a first sentence and a second sentence, among the plurality of sentences, having a same domain being greater than or equal to a threshold value, obtaining a third sentence in which the first sentence and the second sentence are combined by using a first neural network model in operation S740; and performing natural language understanding for the third sentence in operation S750.

The obtaining the third sentence in operation S740 may include identifying a first entity corresponding to the first sentence based on a domain of the first sentence, identifying a second entity corresponding to the second sentence based on a domain of the second sentence, and obtaining a similarity of the first sentence and the second sentence based on the first sentence, the second sentence, the first entity, and the second entity by using a second neural network model.

The obtaining the third sentence in operation S740 may include, based on a similarity of the first sentence and the second sentence being greater than or equal to the threshold value, identifying whether the first entity and the second entity are identical, based on the first entity and the second entity not being identical, obtaining the third sentence using the first neural network model and performing natural language understanding for the third sentence, and the control method may further include, based on the first entity and the second entity being identical, performing natural language understanding for each of the first sentence and the second sentence.

The performing natural language understanding for each of the first sentence and the second sentence may include, based on the first entity and the second entity being identical and a preset text being included between the first sentence and the second sentence, performing natural language understanding for one of the first sentence and the second sentence based on a reception order of the first sentence and the second sentence.

The method may further include, based on the similarity being less than the threshold value, performing natural language understanding for each of the first sentence and the second sentence.

The obtaining the third sentence in operation S740 may include identifying a first entity corresponding to the first sentence based on a domain of the first sentence, identifying a second entity corresponding to the second sentence based on a domain of the second sentence, and obtaining the third sentence based on the first sentence, the second sentence, the first entity, and the second entity using the first neural network model.

The obtaining the third sentence in operation S740 may include identifying the first sentence based on a reception order of the plurality of sentences and identifying the second sentence based on the domain of the first sentence.

The identifying a plurality of sentences in operation S720 may include identifying the plurality of sentences from the obtained text using a third neural network model, and the identifying the domain in operation S730 may include identifying a domain corresponding to each of the plurality of sentences using a fourth neural network model.

The method may further include, based on receiving an additional user voice signal within a threshold time after natural language understanding for the third sentence is completed, obtaining an additional text corresponding to the additional user voice signal, identifying a plurality of additional sentences included in the obtained additional text, identifying a domain corresponding to each of the plurality of additional sentences among a plurality of domains, and updating the third sentence based on the plurality of sentences and sentences having a same domain among the plurality of additional sentences.

The performing natural language understanding in operation S750 may include performing only natural language understanding for at least one sentence among the plurality of sentences based on a priority of a plurality of domains corresponding to each of the plurality of sentences, or sequentially performing natural language understanding for entirety of the plurality of sentences based on an order of a sentence corresponding to each of the plurality of domains.

According to various embodiments, the electronic apparatus may combine a plurality of similar sentences to one sentence and perform natural language understanding for one sentence, thereby reducing an execution time and improving accuracy according to a plurality of sentence combinations.

Meanwhile, various embodiments of the disclosure may be implemented in software, including instructions stored on machine-readable storage media readable by a machine (e.g., a computer). An apparatus may call instructions from the storage medium, and execute the called instruction, including an image processing apparatus (for example, electronic apparatus A) according to the disclosed embodiments. When the instructions are executed by a processor, the processor may perform a function corresponding to the instructions directly or using other components under the control of the processor. The instructions may include a code generated by a compiler or a code executable by an interpreter. A machine-readable storage medium may be provided in the form of a non-transitory storage medium. Herein, the "non-transitory" storage medium may not include a signal but is tangible, and does not distinguish the case in which a data is semi-permanently stored in a storage medium from the case in which a data is temporarily stored in a storage medium.

According to an embodiment of the disclosure, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., Play Store™) or distributed online directly. In the case of online distribution, at least a portion of the computer program product may be at least temporarily stored or temporarily generated in a server of the manufacturer, a server of the application store, or a machine-readable storage medium such as memory of a relay server.

The above-described various embodiments may be implemented in a computer-or similar device-readable recording medium using software, hardware, or a combination thereof. In some embodiments, the embodiments described herein may be implemented by the processor itself. Through the software implementation, the embodiments such as a procedure and function described herein may be implemented with separate software modules. The software modules may perform one or more functions and operations described herein.

Computer instructions for performing the processing operations of a device according to various embodiments described above may be stored in a non-transitory computer-readable medium. The computer instructions stored in the non-transitory computer-readable medium, when executed by a processor of a particular device, may cause a particular device to perform processing operation in the device according to the various embodiments described above. A non-transitory computer-readable medium refers to a medium that stores data semi-permanently, rather than a medium that stores data for a short time, such as a register, cache, memory, etc., and is capable of being read by a device. A specific example of a non-transitory computer-readable medium may be a compact disc (CD), a digital versatile disc (DVD), a hard disk, a Blu-ray disc, a universal serial bus (USB), a memory card, a read only memory (ROM), and the like.

According to various embodiments of the disclosure, the respective elements (e.g., module or program) of the elements mentioned above may include a single entity or a plurality of entities. According to the embodiments, at least one element or operation from among the corresponding elements mentioned above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic apparatus comprising:
a microphone;
a memory storing at least one instruction; and
a processor connected to the microphone and the memory configured to control the electronic apparatus,
wherein the processor, by executing the at least one instruction, is further configured to:
based on receiving a user voice signal through the microphone, obtain a text corresponding to the user voice signal,
identify a plurality of sentences included in the obtained text,
identify a domain corresponding to each of the plurality of sentences among a plurality of domains,
based on a similarity of a first sentence and a second sentence, among the plurality of sentences, having a same domain being greater than or equal to a threshold value, obtain a third sentence in which the first sentence and the second sentence are combined by using a first neural network model, and
perform natural language understanding for the third sentence.

2. The electronic apparatus of claim 1, wherein the processor is further configured to:
identify a first entity corresponding to the first sentence based on a domain of the first sentence,
identify a second entity corresponding to the second sentence based on a domain of the second sentence, and
obtain a similarity of the first sentence and the second sentence based on the first sentence, the second sentence, the first entity, and the second entity by using a second neural network model.

3. The electronic apparatus of claim 2, wherein the processor is further configured to:
based on a similarity of the first sentence and the second sentence being greater than or equal to the threshold value, identify whether the first entity and the second entity are identical,
based on the first entity and the second entity not being identical, obtain the third sentence by using the first neural network model and perform natural language understanding for the third sentence, and
based on the first entity and the second entity being identical, perform natural language understanding for each of the first sentence and the second sentence.

4. The electronic apparatus of claim 3, wherein the processor is further configured to, based on the first entity and the second entity being identical and a preset text being included between the first sentence and the second sentence, perform natural language understanding for one of the first sentence and the second sentence based on a reception order of the first sentence and the second sentence.

5. The electronic apparatus of claim 3, wherein the processor is further configured to, based on the similarity being less than the threshold value, perform natural language understanding for each of the first sentence and the second sentence.

6. The electronic apparatus of claim 1, wherein the processor is further configured to:
identify a first entity corresponding to the first sentence based on a domain of the first sentence,
identify a second entity corresponding to the second sentence based on a domain of the second sentence, and
obtain the third sentence based on the first sentence, the second sentence, the first entity, and the second entity using the first neural network model.

7. The electronic apparatus of claim 1, wherein the processor is further configured to:
- identify the first sentence based on a reception order of the plurality of sentences, and
- identify the second sentence based on the domain of the first sentence.

8. The electronic apparatus of claim 1, wherein the processor is further configured to:
- identify the plurality of sentences from the obtained text using a third neural network model, and
- identify a domain corresponding to each of the plurality of sentences using a fourth neural network model.

9. The electronic apparatus of claim 1, wherein the processor is further configured to:
- based on receiving an additional user voice signal within a threshold time after natural language understanding for the third sentence is completed, obtain an additional text corresponding to the additional user voice signal,
- identify a plurality of additional sentences included in the obtained additional text,
- identify a domain corresponding to each of the plurality of additional sentences among a plurality of domains, and
- update the third sentence based on the plurality of sentences and sentences having a same domain among the plurality of additional sentences.

10. The electronic apparatus of claim 1, wherein the processor is further configured to:
- perform only natural language understanding for at least one sentence among the plurality of sentences based on a priority of a plurality of domains corresponding to each of the plurality of sentences, or
- sequentially perform natural language understanding for entirety of the plurality of sentences based on an order of a sentence corresponding to each of the plurality of domains.

11. The electronic apparatus of claim 1, wherein the text includes the plurality of sentences.

12. A control method of an electronic apparatus, the method comprising:
- based on receiving a user voice signal, obtaining a text corresponding to the user voice signal;
- identifying a plurality of sentences included in the obtained text;
- identifying a domain corresponding to each of the plurality of sentences among a plurality of domains;
- based on a similarity of a first sentence and a second sentence, among the plurality of sentences, having a same domain being greater than or equal to a threshold value, obtaining a third sentence in which the first sentence and the second sentence are combined by using a first neural network model; and
- performing natural language understanding for the third sentence.

13. The method of claim 12, wherein the obtaining of the third sentence comprises:
- identifying a first entity corresponding to the first sentence based on a domain of the first sentence;
- identifying a second entity corresponding to the second sentence based on a domain of the second sentence; and
- obtaining a similarity of the first sentence and the second sentence based on the first sentence, the second sentence, the first entity, and the second entity by using a second neural network model.

14. The method of claim 13,
wherein the obtaining of the third sentence comprises:
- based on a similarity of the first sentence and the second sentence being greater than or equal to the threshold value, identifying whether the first entity and the second entity are identical, and
- based on the first entity and the second entity not being identical, obtaining the third sentence by using the first neural network model and performing natural language understanding for the third sentence, and wherein the control method further comprises:
- based on the first entity and the second entity being identical, performing natural language understanding for each of the first sentence and the second sentence.

15. The method of claim 14, wherein the performing of the natural language understanding for each of the first sentence and the second sentence comprises, based on the first entity and the second entity being identical and a preset text being included between the first sentence and the second sentence, performing natural language understanding for one of the first sentence and the second sentence based on a reception order of the first sentence and the second sentence.

16. The method of claim 14, further comprising:
- based on the similarity being less than the threshold value, performing natural language understanding for each of the first sentence and the second sentence.

17. The method of claim 13, wherein the second neural network model is a model trained based on a plurality of sample sentences and sample similarity.

18. The method of claim 17, wherein the sample similarity is an intent of sentences in a similarity setting process.

* * * * *